United States Patent [19]
Kim

[11] Patent Number: 5,836,010
[45] Date of Patent: Nov. 10, 1998

[54] PERSONAL COMPUTER USING CHIP-IN CARD TO PREVENT UNAUTHORIZED USE

[75] Inventor: Young-Il Kim, Kyungki-do, Rep. of Korea

[73] Assignee: SamSung Electronics Co., Ltd., Suwon, Rep. of Korea

[21] Appl. No.: 616,135

[22] Filed: Mar. 14, 1996

[30] Foreign Application Priority Data

Mar. 14, 1995 [KR] Rep. of Korea ............... 1995/5258

[51] Int. Cl.⁶ .................... H04L 9/00; H04K 1/00
[52] U.S. Cl. ............... 395/186; 395/188.01; 380/4; 380/25; 340/825.3
[58] Field of Search ................ 395/186, 188.01; 382/115, 160; 340/500, 825.3, 825.31; 364/550, 479.07; 380/25, 4

[56] References Cited

U.S. PATENT DOCUMENTS

| | | | |
|---|---|---|---|
| 3,701,885 | 10/1972 | Webb et al. | 235/447 |
| 3,740,530 | 6/1973 | Hoffer et al. | 235/380 |
| 3,857,018 | 12/1974 | Stark et al. | 235/382 |
| 3,875,375 | 4/1975 | Scuitto et al. | 325/380 |
| 4,907,111 | 3/1990 | Derman | 360/97.02 |
| 4,974,193 | 11/1990 | Beutelspacher et al. | 395/800 |
| 5,091,939 | 2/1992 | Cole et al. | 380/25 |
| 5,097,506 | 3/1992 | Kaiser, Jr. et al. | 380/25 |
| 5,226,080 | 7/1993 | Cole et al. | 380/25 |
| 5,233,658 | 8/1993 | Bianco et al. | 380/25 |
| 5,282,247 | 1/1994 | McLean et al. | 380/25 |
| 5,297,200 | 3/1994 | Murray | 380/4 |
| 5,327,497 | 7/1994 | Mooney et al. | 380/25 |
| 5,347,580 | 9/1994 | Molva et al. | 380/25 |
| 5,448,045 | 9/1995 | Clark | 235/382 |
| 5,537,544 | 7/1996 | Morisawa et al. | 395/188.01 |

*Primary Examiner*—Ly Hua
*Attorney, Agent, or Firm*—Robert E. Bushnell, Esq.

[57] ABSTRACT

A personal computer system capable of preventing unauthorized user's access by way of a chip-in card including a card read and write unit for detecting the insertion or ejection of the chip-in card; a card read and write controller for generating an interrupt in response to the insertion or ejection of the chip-in card; at least one input means for allowing the user to input commands and information to gain access to the computer; and a host controller responsive to the interrupt from the card read and write controller, for preventing the input of commands and/or information from the input means, when the chip-in card is ejected, but allowing input of commands and information from the input means, when the chip-in card is inserted in position of the card read and write unit. Accordingly, the personal computer system can be controlled so that access to the computer or designated program cannot be realized without a personal identification card, while other unrestricted programs can be executed during the control of the computer system in order to increase its operation efficiency.

15 Claims, 4 Drawing Sheets

PERSONAL COMPUTER USING CHIP-IN CARD TO PREVENT UNAUTHORIZED USE

CROSS-REFERENCE TO RELATED APPLICATIONS

This application makes reference to, incorporates the same herein, and claims all benefits accruing under 35 U.S.C. §119 from an application for Personal Computer Using Chip-In Card To Prevent Unauthorized Use earlier filed in the Korean Industrial Property Office on 14 Mar. 1995 and there duly assigned Ser. No. 5258/1995.

BACKGROUND OF THE INVENTION

1. Technical Field

The present invention relates to a personal computer system, and more particularly to a personal computer system having a card read and write unit which uses a chip-in card for preventing unauthorized use of programs by locking access to the computer through an input device such as a keyboard or a mouse until an authorized chip-in card is inserted.

2. Background Art

As personal computer systems become more accessible to public, confidential data on files contained therein is increasingly susceptible to unauthorized inspection. Accordingly, it is necessary to ensure that access to such confidential data and systems is restricted to certain authorized users. Traditionally, many personal computer systems use a physical key switch as a means to restrict access to the computer. The mechanical key switch is provided at a keyboard and used to disable all keyboard activity. For example, if the key switch is manually switched to an unlocked position, the keyboard characters are transmitted to the computer. If, on the other hand, the key switch is manually switched to a locked position, the keyboard characters are not transmitted to the computer. This technique, however, fails to provide a practical means of controlling a variety of levels of authorized access to given types of data or peripherals. Moreover, the required manipulation of the mechanical key switch hardly restricts access to the computer.

Another technique for restricting unauthorized access to the computer system involves a software based password feature in which the password from a user is required in order to gain access to the computer systems. Typically, only authorized users are assigned a password. Each time the user wishes to use the computer system, he/she must first enter the password through an keyboard. If the computer system recognizes the password as valid, the user will be permitted to access the data and/or execute the programs stored therein. Persons not entering a valid password are unable to access the data or program information. In this way, the password protection scheme protects the propriety or confidential information retained by the computer system and prevents unauthorized use. A variation of this password protection scheme is disclosed, for example, in U.S. Pat. No. 5,097,506 for Keyboard Password Lock issued to Kaiser.

To maintain the integrity of the password protection system, however, authorized users are commonly instructed to refrain from writing or otherwise recording their passwords. Although this procedure prevents unauthorized users from accessing the computer systems, however, the authorized users must memorize their passwords; otherwise, a forgotten password renders a computer useless. In order to extend the benefits of password protection to a forgetful user, many computer manufacturers such as those disclosed, for example, in U.S. Pat. Nos. 5,091,939 and 5,226,080 for Method And Apparatus For Password Protection Of A Computer issued to Cole et al. provide a secondary password by way of telephone for allowing the forgetful but authorized user to gain access to the computer systems when a primary password is forgotten. In such a conventional password protection scheme, however, if an unauthorized user obtains the password, then unauthorized uses can not be prevented. Moreover, this password protection scheme may also be bypassed by commercially available software development tools. Furthermore, this protection scheme does not allow operation of applied programs during the time unauthorized use is prevented. Consequently, it has been my observation that it is difficult for the user to access the computer effectively.

A more recent technique for restricting unauthorized access to the computer system involves the use of an IC card such as disclosed, for example, in U.S. Pat. No. 5,297,200 for Computer Security System issued to Murray and U.S. Pat. No. 5,327,497 for Preboot Protection Of Unauthorized Use Of Programs And Data With A Card Reader Interface issued to Mooney et al. In Murray '200, for example, a card reader is integrated into a computer system for reading data from a memory card and for enabling software to compare with authorization data contained in the computer in order to enable or disable further operation of the protected program. Similarly, Mooney '497 discloses a personal computer system comprising a computer, a keyboard, a card interface board having an integrated circuit card (i.e., an IC card) reader for accommodating an IC card used as a means to access the computer system if an authorization code stored in the IC card matches to the code entered by the user. Otherwise, the IC card reader serves to prevent unauthorized use of the computer. In Mooney '497, however, the authorized user is required to enter an authorized code before the computer system can be accessed. If the authorized user forgets his or her authorized code, the forgotten code also renders the computer system useless. Accordingly, it has been my observation that neither Murray '200 nor Mooney '497 effectively utilizes the IC card as a means to prevent unauthorized use of the personal computer system, and I have discovered a need for further improvement using an IC card as a means to prevent unauthorized use of the computer system.

SUMMARY OF THE INVENTION

Accordingly, it is therefore an object of the present invention to provide an improved process and apparatus for controlling use of a personal computer.

It is another object to provide a process and apparatus enabling a personal computer system to effectively prevent unauthorized use of the computer by way of a chip-in card.

It is still another an object provide a process and a personal computer system capable of preventing unauthorized use of the computer by controlling data input by an input device such as a keyboard or a mouse in accordance with the insertion or ejection of a chip-in card.

It is yet another object to provide a process and a personal computer system capable of maximizing the efficiency of the system by allowing access to certain programs while preventing unauthorized access of other programs contained in the computer.

It is also an object to provide a process and a personal computer system capable of preventing unauthorized access to certain programs of the computer in dependence upon an insertion or ejection of a chip-in card, while concomitantly allowing operation of other programs contained in the computer.

These and other objects of the present invention may be achieved by a personal computer system constructed with a card read and write unit having a card reception slot, for determining whether a chip-in card is inserted into the reception slot and for determining whether the inserted card is authorized for enabling an operator to access to the computer system in dependence upon the insertion or ejection of the chip-in card; a card read and write controller connected to the card read/write unit, for generating an interrupt signal in dependence upon the insertion or ejection of the chip-in card, and for controlling the reading and writing of information on the chip-in card through the card read/write unit; a keyboard for allowing the operator to input commands and information to gain access to the computer system; and a host controller connected to the card read and write controller, for locking the keyboard from inputting commands and information to gain access to the computer system and for unlocking the keyboard to allow the input of commands and information from the keyboard to gain access to the computer system in dependence upon reception of the interrupt signal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
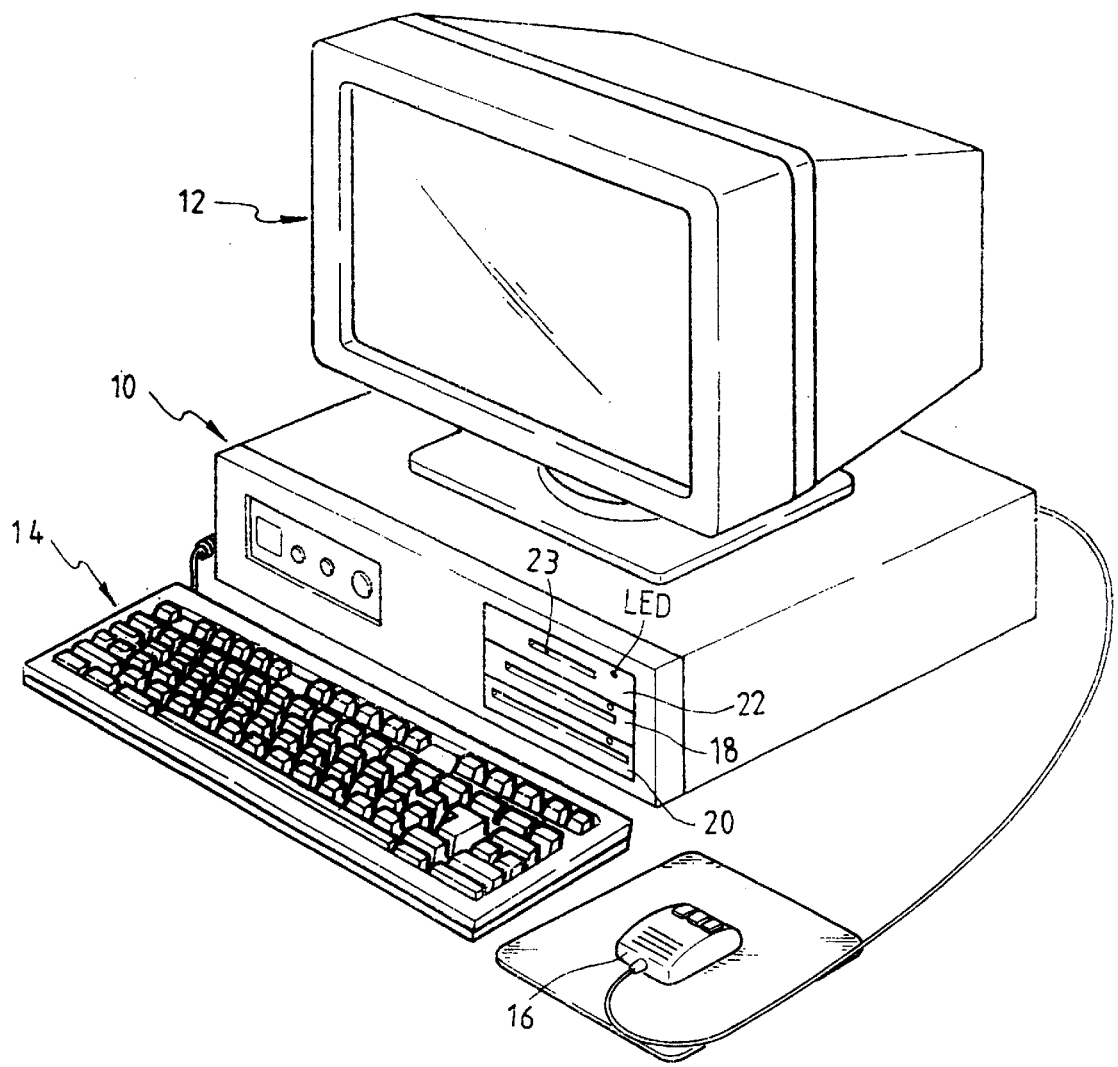
FIG. 1 illustrates a personal computer system including a chip-in card read/write unit constructed according to the principles of the present invention.

Referring now to the drawings and particularly to FIG. 1, which illustrates a personal computer system constructed according to the principles of the present invention. The personal computer system of FIG. 1 includes a main computer unit 10, a monitor 12, and input devices such as a keyboard 14 and a mouse 16. The main computer unit 10 includes auxiliary memory devices such as a 3.5" floppy disk drive 18, a 5.25" floppy disk drive 20, a hard disk drive (not shown), and a card read and write unit 22 having a chip-in card insertion opening 23. A light emitting diode (LED) is installed in card read and write unit 22, and floppy disk drives 18 and 20, respectively, to indicate the operational status therewith.

The chip-in card as contemplated by the present invention is generally referred to as an IC card, an electronic card, a smart card or a memory card. The chip-in card is a conventional plastic card containing an integrated circuit installed in the plastic card and having a liquid crystal display section and battery installed on one side for enabling an operator to inquire and provide a visual display of the information contents of the card's memory. Such an IC card also contains read only memory (i.e., a ROM), a random access memory (i.e., a RAM), a central processing unit (i.e., microcomputer), a plurality of connectors (usually eight contacts) connecting to a terminal in accordance with ISO standards (International Standardization Organization) for supplying power and enabling data processing, and a non-volatile memory capable of storing information such as, for example, personal identification of the operator.

Figure 2:
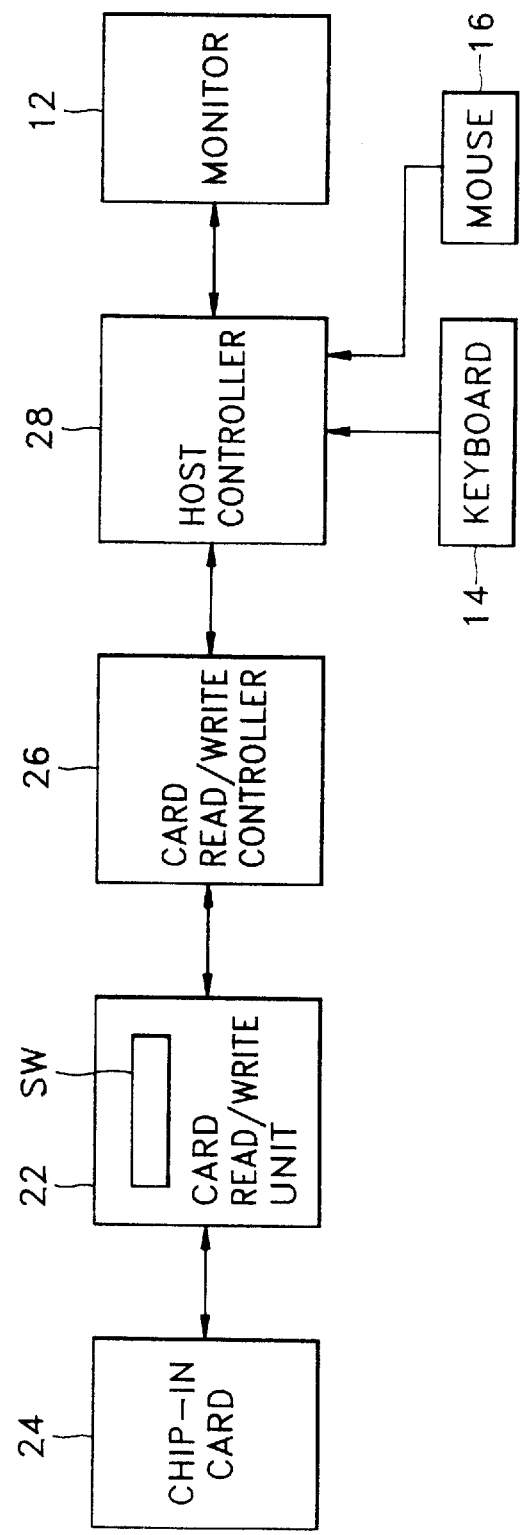
FIG. 2 is a block diagram illustrating the structure of a personal computer system including the card read and write unit as shown in FIG. 1.

Turning now to FIG. 2, the personal computer system constructed according to the principles of the present invention includes a card read/write unit 22 for detecting the insertion or ejection of a chip-in card 24 and providing electrical connections to the chip-in card, a card read and write controller 26 for generating an interrupt by detecting signals generated from the card read and write unit 22 and controlling the reading and writing of information through card read and write unit 22, and a host controller 28 for receiving the interrupt generated from card read and write controller 26 and controlling the input of commands and information from at least one input device such as a keyboard 14 or a mouse 16 in order to allow authorized access or deny unauthorized access to the computer. Here, when the chip-in card 24 is inserted into the card insertion opening or slot 23 of the card read and write unit 22 but subsequently ejected from the card insertion opening 23 if the inserted card 24 is determined as an unauthorized or invalid card, the host controller 28 receives the interrupt and prevents the input of commands and/or information from the input devices to deny access the computer. When the chip-in card 24 is inserted into the card insertion opening 23 of the card read and write unit 22 and is maintained inserted in the card insertion opening 23 when the inserted card 24 is determined as an authorized or valid card, the host controller 28 receives the interrupt and allows the input of commands and/or information therefrom in order to access the computer and output a processing result to the monitor 12.

The chip-in card 24 as described above may be generally classified as being one of two different types. The first type is active-type known as an IC card which is provided with a microcomputer and a memory, while a second type is a passive-type containing a memory but not microcomputer and is known simply as a memory card. Typically, the physical shape, and dimensions are standardized according to the International Standardization Organization.

Card read and write unit 22 includes a detection switch (not shown) which is triggered upon detection of signals received from the chip-in card 24 when the chip-in card 24 is inserted into the card insertion opening 23, an LED indicator lamp which is lit when the chip-in card 24 is inserted and not lit when the chip-in card 24 is not inserted, and contact terminals for electrically connecting to the pins of inserted card 24. Here, the insertion and ejection of the chip-in card 24 in card read and write unit 22 is driven by a loading motor (not shown).

Card read and write controller 26 generally includes a central processing unit (CPU), a read-only-memory (ROM) for storing application or main programs, a random-access-memory (RAM) for storing data generated from operating the application programs, an RS 232C port, an ISA-BUS interface and a card interface. Card read and write controller 26 is installed in the main computer unit 10, and connected to the card read and write unit 22 by multi-wiring and to host controller 28 through the ISA-BUS interface to allow data communication. Here, detecting signals generated when the detection switch of card read and write unit 22 is triggered are received to control the LED indicator lamp according to the insertion or ejection of the chip-in card 24, and interrupt signals generated by an interrupt routine for preventing unauthorized use are transmitted to host controller 28.

The host controller 28 includes a central processing unit (CPU) of the personal computer system, for performing an interrupt routine in order to prevent unauthorized use of the computer system, if an eject interrupt is supplied from card read and write controller 26 to control the computer system, when there is no chip-in card 24 inserted. That is, the host controller 28 prevents the input of commands through keyboard 14 or mouse 16. Here, in order to enhance the use efficiency of the computer, other applied program such as a printing function operating internally without user input can continue to be performed while preventing unauthorized use of the main program.

Figure 3:
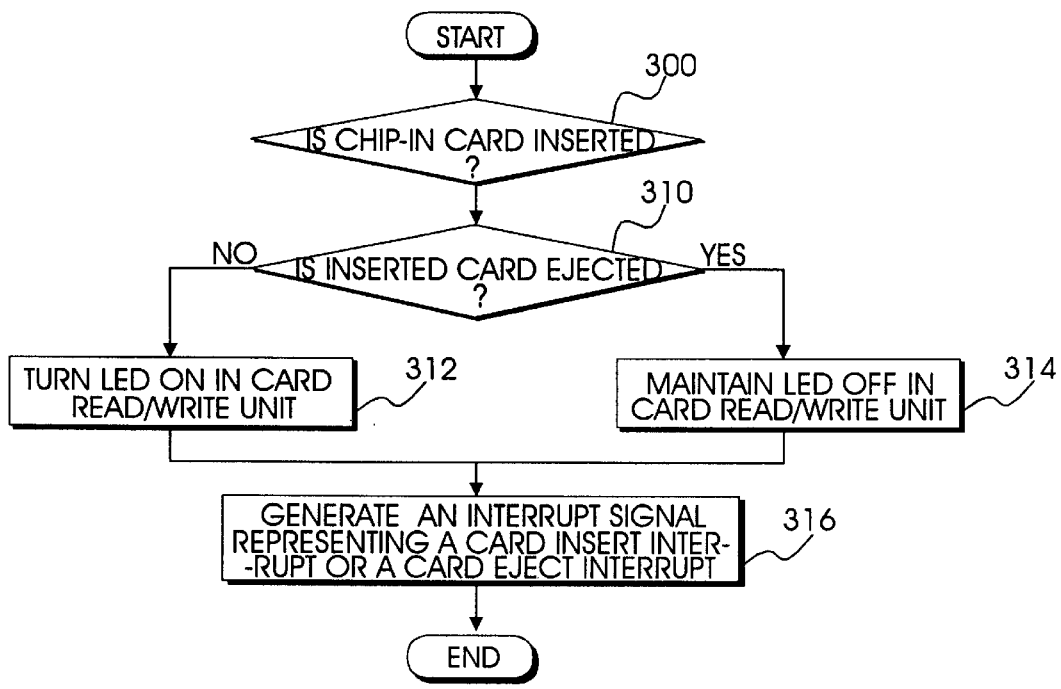
FIG. 3 is a flowchart of a card insertion interrupt routine for determining whether a chip-in card has been inserted into the card read/write unit as shown in FIG. 2.

Turning now to FIG. 3, which illustrates a card insertion interrupt routine for determining whether a chip-in card 24 has been inserted into the card read and write unit 22. When the chip-in card 24 of FIG. 2 is inserted into the card insertion opening 23 of the card read and write unit 22, the detection switch is turned on, and the card read and write controller 26 determines whether the chip-in card 24 is inserted at step 300. Once the chip-in card 24 is inserted at step 300, card read and write controller 26 determines whether the inserted card 24 is maintained inserted in the card insertion opening 23 or ejected from the card insertion opening 23 at step 310 according to a detection signal output from card read and write unit 22. If the inserted card 24 is maintained inserted, the LED of card read and write unit 22 is turned on at step 312 which allows the card read and write controller 26 to generate a card insert interrupt at step 316. If, on the other hand, the inserted card 24 is ejected from the card insertion opening 23 of the card read and write unit 22, the detection switch is turned off, thereby enabling card read and write controller 26 to maintain the LED of card read and write unit 22 in an off state at step 314. After that, card read and write controller 26 generates a card ejection interrupt at step 316 and terminates the interrupt routine.

Figure 4:
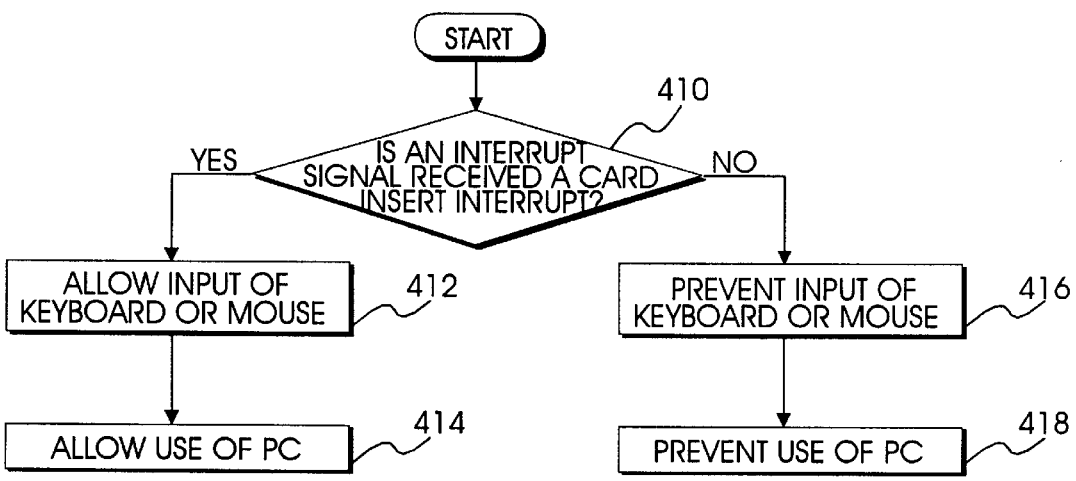
FIG. 4 is a flowchart of an unauthorized use interrupt routine for preventing unauthorized use of the computer in dependence upon whether a chip-in card has been inserted into the card read/write unit as shown in FIG. 2.

Referring now to FIG. 4, which illustrates an unauthorized use interrupt routine for preventing unauthorized use of the computer in dependence upon whether a chip-in card 24 has been inserted into the card read and write unit 22 as shown in FIG. 2. After an interrupt signal representing either a card insert interrupt or a card eject interrupt is generated from card read and write controller 26, the host controller 28 determines whether the interrupt signal received from the card read and write controller 26 at step 410 is one of a card insert interrupt or a card eject interrupt. When the interrupt signal received from card read and write controller 26 is a card insert interrupt which indicates that the chip-in card 24 is maintained inserted in the card insertion opening 23 of card read and write unit 22, the host computer 28 allows the input of the keyboard 14 or the mouse 16 at step 412 in order to gain access to the personal computer and to make a complete use of the personal computer at step 414. When the interrupt signal received from card read and write controller 26 is a card ejection interrupt which indicates that the chip-in card 24 is ejected from the card insertion opening 23 of card read and write unit 22, however, the host computer 28 prevents the input from the keyboard 14 or the mouse 16 at step 416 in order to prevent unauthorized use of the computer at step 418. After performing steps 414 and 418, the program ends.

Figure 5:
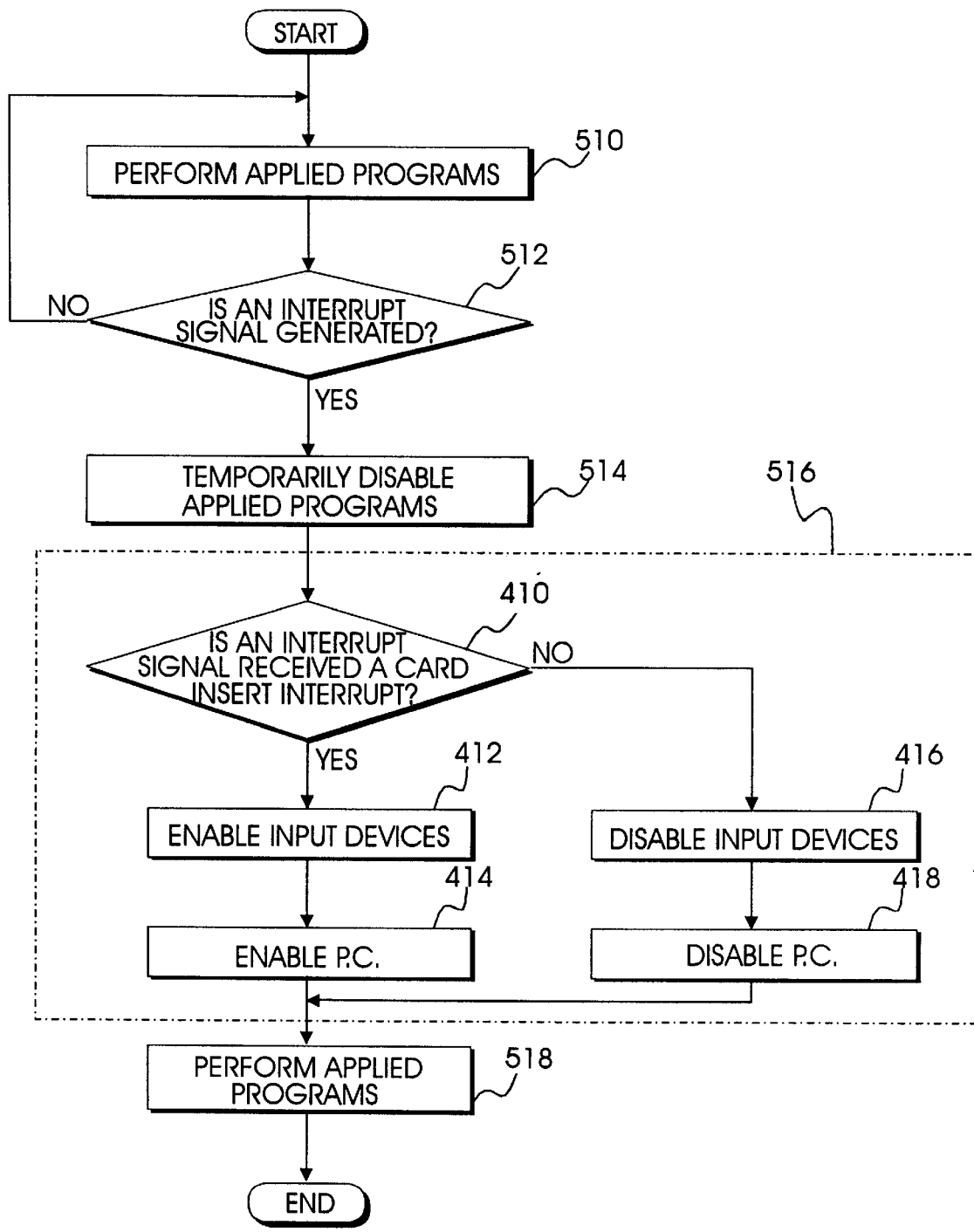
FIG. 5 is a flowchart illustrating a main program having an interrupt function for preventing unauthorized use of the computer as shown in FIG. 2.

Referring to FIG. 5, which illustrates the relationship between the unauthorized use prevention program and the application program currently executed. When the computer is booted up, the card insertion interrupt routine is loaded into the main memory. During this time, applied programs can be performed at step 510. The interrupt routine determines whether an interrupt signal has been generated from the card read and write controller 26 at step 512. When an interrupt signal is generated at step 512, applied programs are temporarily disabled at step 514. Then the unauthorized use interrupt routine of FIG. 4 is performed at step 516 to lock or unlock the command input from the keyboard 14. After determining whether the input devices and the PC are to be is enabled or disabled, the applied programs can be resumed at step 518.

According to the present invention, the chip-in card can control the input of the input device, and the use of the computer. That is, an interrupt generated by the insertion or ejection of the chip-in card can control the input of the input device. Thus, the present invention contemplates on the insertion of a chip-in card as a mechanism to allow or prevent input of the keyboard or mouse in order to control access to the computer. The structure as contemplated by the present invention is simple and very economical. Moreover, the interrupt method can continue performing other applied programs so that the input control can not reduce the operation efficiency of the computer.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for preventing unauthorized use of a computer system by locking a keyboard in the computer system, said apparatus comprising:

a card read and write unit having a card reception slot, for determining whether a chip-in card is inserted into said reception slot and for determining whether the inserted card is authorized for enabling an operator to access the computer system;

a card read and write controller connected to said card read and write unit, for generating an interrupt signal in response to insertion of said chip-in card, and for controlling the reading and writing of information on said chip-in card through said card read and write unit;

a keyboard for allowing the operator to input commands and/or information to the computer system; and a host controller connected to said card read and write controller, for locking the keyboard from inputting commands and information to the computer system and for unlocking the keyboard to allow the input of commands and information from said keyboard to gain access to the computer system in dependence upon said interrupt signal.

2. The computer system of claim 1, further comprised of said interrupt signal representing a card insertion interrupt, when the inserted card is maintained in position in the reception slot of said card read and write unit.

3. The personal computer system of claim 2, further comprised of said interrupt signal representing a card ejection interrupt when the inserted card is ejected from the reception slot of said card read and write unit.

4. The personal computer system of claim 3, further comprised of said host controller locking the keyboard when said interrupt signal represents a card ejection interrupt, and alternatively unlocking the keyboard when said interrupt signal represents a card insertion interrupt.

5. The personal computer system of claim 1, further comprised of said host controller temporarily disabling operation of an application program upon detection of the insertion or ejection of said chip-in card for locking or unlocking the keyboard, and then resuming operation of said application program.

6. The personal computer system of claim 1, further comprised of said card read and write unit comprising a light-emitting-diode for alerting the operator of the insertion or ejection of said chip-in card.

7. A computer system, comprising:
   an operator input device;
   a card reader having a reception slot;
   a controller responsive to an unauthorized use program to perform the authorization steps of:
      controlling said card reader to determine whether a chip-in card is inserted into said reception slot;
      when said chip-in card is inserted into said reception slot, generating an interrupt signal;
      allowing an operator to input commands and information through said operator input device to gain access to the computer systems when said interrupt signal indicates that the inserted card is maintained in position in the reception slot after a predetermined period; and
      locking said operator input device from inputting commands and information to the computer system thereby preventing unauthorized access to the computer system, when said interrupt signal indicates that the inserted card is rejected from the reception slot after said predetermined period.

8. The computer system of claim 7, further comprised of said interrupt signal representing a card insertion interrupt, when the inserted card is maintained in position in the reception slot of said card reader.

9. The computer system of claim 8, further comprised of said interrupt signal representing a card ejection interrupt when the inserted card is ejected from the reception slot of said card reader.

10. The computer system of claim 9, further comprised of said controller preventing unauthorized access to one type of programs stored in the computer system when said chip-in card is ejected from the reception slot of said card reader while concurrently permitting execution of another type of programs stored in the computer system.

11. The computer system of claim 7, further comprised of said card reader comprising a light-emitting-diode for alerting the operator of the insertion or ejection of said chip-in card.

12. A method for preventing unauthorized use of a personal computer system having an operator input device, a card reader having a reception slot for receiving an IC card, and a central processor for storing a main program and an unauthorized use interrupt routine, said method comprising the steps of:
   executing said main program after the computer system is booted;
   controlling said card reader to determine whether an IC card is inserted into the reception slot of said card reader;
   when said IC card is inserted into or ejected from said reception slot, executing said unauthorized use interrupt routine to determine whether the inserted IC card is authorized for enabling an operator to access to the computer system;
   generating an interrupt signal in dependence upon whether the inserted IC card is maintained in position of the reception slot or ejected from the reception slot of said card reader;
   temporarily disabling operation of said main program;
   allowing the operator to input commands and information through said operator input device to access to the computer system in response to said interrupt signal when said interrupt signal indicates that the inserted IC card is maintained in position of the reception slot of said card reader;
   alternatively, locking said operator input device from allowing the operator to input commands and information through said operator input device to access to the computer system thereby preventing unauthorized access to the computer system in response to said interrupt signal when said interrupt signal indicates that the inserted IC card is ejected from the reception slot of said card reader; and
   resuming to execute operation of said main program.

13. The method of claim 12, further comprised of said card reader comprising a light-emitting-diode for alerting the operator of the insertion or ejection of said IC card.

14. A computer system, comprising:
   a card unit having a reception slot, for determining whether a chip-in card is inserted into said reception slot;
   a card controller connected to said card reader, for generating an interrupt signal when said chip-in card is inserted in said reception slot, and for controlling reading and writing of information on said chip-in card through said card unit;
   a keyboard for allowing an operator to input commands and/or information to the computer system; and
   a central processor connected to said card controller and having a memory storing a main program and an unauthorized use interrupt routine for preventing unauthorized use of the computer system, said central processor preventing unauthorized use of the computer system by:
      executing said main program after the computer system is booted;
      controlling said card unit to determine whether said chip-in card is inserted into the reception slot of said card unit;
      when said chip-in card is inserted into or ejected from said reception slot, executing said unauthorized use interrupt routine to determine whether the inserted card is authorized for enabling the operator to access the computer system;

controlling said card controller to generate the interrupt signal in response to whether the inserted card is maintained in position of the reception slot or ejected from the reception slot of said card unit;

temporarily disabling operation of said main program;

allowing the operator to input commands and information through said keyboard to access the computer system, when said interrupt signal indicates that the inserted card is maintained in position of the reception slot of said card unit;

alternatively, locking said keyboard from allowing the operator to input commands and information through said keyboard to access the computer system, when said interrupt signal indicates that the inserted card is ejected from the reception slot of said card unit; and resuming to execute operation of said main program.

15. The computer system of claim 14, further comprised of said card unit comprising a light-emitting-diode for alerting the operator of the insertion or ejection of said chip-in card.

* * * * *